United States Patent
Blaszczykiewicz

(10) Patent No.: US 6,861,379 B1
(45) Date of Patent: Mar. 1, 2005

(54) BREATHABLE NEOPRENE SUBSTITUTE

(75) Inventor: Thomas Blaszczykiewicz, Hamburg, NY (US)

(73) Assignee: Accu-Med Technologies, Inc., Buffalo, NY (US)

( * ) Notice: Subject to any disclaimer, the term of this patent is extended or adjusted under 35 U.S.C. 154(b) by 0 days.

(21) Appl. No.: 09/503,429

(22) Filed: Feb. 14, 2000

Related U.S. Application Data

(60) Provisional application No. 60/120,164, filed on Feb. 16, 1999.

(51) Int. Cl.$^7$ ............... B32B 9/00; B32B 31/26
(52) U.S. Cl. ............... 442/373; 156/82; 602/41; 602/26
(58) Field of Search .................. 602/41, 26; 156/82

(56) References Cited

U.S. PATENT DOCUMENTS

| | | |
|---|---|---|
| 4,782,605 A | 11/1988 | Chapnick |
| 5,139,476 A | 8/1992 | Peters |
| 5,160,314 A | 11/1992 | Peters |
| 5,689,828 A | 11/1997 | Mah |
| 5,738,937 A | 4/1998 | Baychar |
| 5,900,087 A * | 5/1999 | Chakrabarti et al. .......... 156/82 |

* cited by examiner

*Primary Examiner*—Glenn Caldarola
*Assistant Examiner*—Alexis Wachtel
(74) *Attorney, Agent, or Firm*—Simpson & Simpson, PLLC

(57) ABSTRACT

A tri-laminate material is disclosed which provides a breathable, non-irritating, four-way stretchable substitute for neoprene-based materials. The material of the present invention comprises a layer of resiliently stretchable open-celled foam which has been compressed 4 to 1; an outer layer of resiliently stretchable loop fabric, and an inner layer of resiliently stretchable wicking fabric. The fabric layers are fixed to opposite surfaces of the foam layer by flame lamination, either in two passes or in one pass.

13 Claims, 1 Drawing Sheet

BREATHABLE NEOPRENE SUBSTITUTE

CROSS-REFERENCE TO RELATED APPLICATIONS

The present application claims benefit under 35 U.S.C. § 119(e) of U.S. Provisional Patent Application Ser. No. 60/120,164 filed Feb. 16, 1999.

BACKGROUND OF THE INVENTION

A. Field of the Invention

The present invention relates generally to the field of resiliently stretchable cushioning materials for a wide variety of applications, and more particularly to a novel substitute for layered neoprene-based materials and a process for manufacturing same.

B. Description of the Prior Art

Materials having at least one layer of stretchable fabric bonded to a layer of neoprene synthetic rubber are well-known, and are currently used in a wide variety of products, including medical devices such as knee and elbow braces and head gear apparatus for treatment of sleep apnia. Two common complaints are heard with respect to such materials of the prior art. First, neoprene does not permit the skin covered by the material to breath. As a result, products made with neoprene are uncomfortable to wear for extended periods of time. Second, adhesive is used to bond the fabric layer to the neoprene layer, which causes skin irritation in some individuals.

U.S. Pat. No. 5,139,476 discloses a knee wrap formed of a resiliently flexible laminate comprising an outer elasticized fabric layer, an open-cell polymeric foam core, and an inner elasticized fabric layer. This patent does not disclose compressing the foam layer prior to fixing the fabric layers thereto, or using flame lamination for bonding.

U.S. Pat. No. 4,782,605 describes a shoe insert tri-laminate having a foam layer which is flame laminated to a fabric layer, and a base layer of foam which is subsequently flame laminated to the foam layer.

SUMMARY OF THE INVENTION

It is an object of the present invention to provide a breathable substitute material for neoprene-based materials.

It is another object of the present invention to provide a laminate material which does not use adhesive for bonding.

It is a further object of the present invention to provide a material which mimics the behavior of neoprene by being stretchable in all directions.

In accordance with the stated objects, a tri-laminate material is disclosed which provides a breathable, non-irritating substitute for neoprene-based materials. The material of the present invention comprises a layer of resiliently stretchable open-celled foam which has been compressed 4 to 1; an outer layer of resiliently stretchable loop fabric, and an inner layer of resiliently stretchable wicking fabric. The fabric layers are fixed to opposite surfaces of the foam layer by flame lamination, either in two passes or in one pass.

BRIEF DESCRIPTION OF THE DRAWING

The nature and mode of operation of the present invention will now be more fully described in the following detailed description of the preferred embodiment taken with the accompanying drawing figure, in which.

DETAILED DESCRIPTION OF THE PREFERRED EMBODIMENTS

Figure 1:
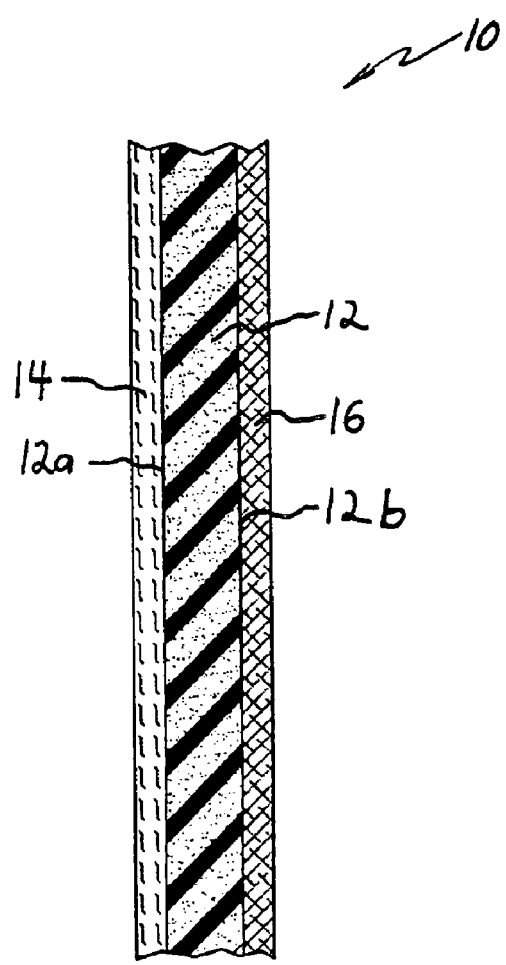
FIG. 1 is a cross-sectional view a material formed in accordance with a preferred embodiment of the present invention.

Referring initially to FIG. 1, a layered material formed in accordance with a first embodiment of the present invention is shown and identified generally by the reference numeral 10. Material 10 comprises a central foam layer 12, an inner fabric layer 14 fixed to an inner surface 12a of foam layer 12, and an outer fabric layer 16 fixed to an outer surface 12b of foam layer 12. Material 10 is intended for use in a wide variety of consumer products, many of which involve surface-to-surface contact between material 10 and skin of a user. Protective garments, medical braces, and medical head gear are examples of products which may incorporate material 10. Consequently, material 10 is designed to be breathable, have "four-way" stretchability, and be non-irritating to individuals having sensitive skin.

Foam layer 12 comprises an open cell foam to allow air flow therethrough. A suitable foam is polyurethane sold under the registered trademark FOAMEX®, identification number A200-50D, and having the following specified properties:

| | | |
|---|---|---|
| Density | 1.95–2.07 lbs/ft$^3$ | (ASTM D 3574-86 Test A) |
| Tensile Strength | 18.0 psi minimum | (ASTM D 3574-86 Test E) |
| Elongation | 220% minimum | (ASTM D 3574-86 Test E) |
| Tear Strength | 2.5 lb/in minimum | (ASTM D 3574-86 Test F) |
| Load Deflection @ 25% | 50 ± 5 lbs | (ASTM D 3574-86 Test $B_1$) |
| Compression Set @ 50% | 10.0% maximum | (ASTM D 3574-86 Test D) |
| Flammability | SE. 4/minute max. | (FMVSS 302). |

In accordance with a preferred embodiment of the present invention, foam layer 12 is compressed at a four-to-one ratio, such that its final thickness, preferably about 0.155 inches, is one-quarter its original thickness. The compressed foam has a higher density which allows it to mimic the four-way stretch behavior and density characteristics of neoprene synthetic rubber. A desired density of approximately 8 lbs/ft$^3$ is achieved after compression. Since foam layer 12 is of an open-celled construction, it is permeable by air and thus breathable, a feature lacking in neoprene of the prior art.

Inner fabric layer 14 comprises a porous, four-way stretchable fabric which is designed to wick moisture away from the skin surface. A currently preferred fabric contains 83% semi-dull COOLMAX® polyester and 17% lycra. Consequently, material 10 is hydrophilic to keep skin dry and prevent irritation.

Likewise, outer fabric layer 16 comprises a porous, four-way stretchable fabric. Outer fabric layer 16 is preferably a "loop" fabric for receiving VELCRO hooks. A currently preferred fabric contains 8.99% bright nylon, 10.85% semi-dull nylon, and 80.16% bright lycra.

The process of manufacturing material 10 will now be described. Outer fabric layer 16 is fixed to outer surface 12b of compressed foam layer 12 by flame lamination. During flame lamination, foam surface 12b is first heated and then brought into contact with outer fabric layer 16 under predetermined pressure conditions to achieve bonding between the two layers. A flame lamination machine having roller spacing (nip) settings at 0.7 mm platform and 0.7 mm floor, and a slow speed setting of 8 meters per minute, is used to flame laminate outer fabric layer 16 to foam layer 12. A curing time of about one hour is satisfactory. Inner fabric layer 14 is then fixed to inner surface 12a of compressed foam layer 12 by flame lamination using the same machine settings. A similar curing time of about one hour is allowed.

While the process described above necessitates two passes of foam layer 12 through a flame lamination machine, it is contemplated to flame laminate both the inner and outer fabric layers 14 and 16 to foam layer 12 in one pass. Since each pass of foam layer 12 through the flame lamination machine reduces its four-way stretch characteristics somewhat, a single pass method of manufacture would be preferable. However, the serpentine path foam layer 12 must travel for one-pass flame lamination may possibly result in uneven bonding and pockets between the foam and fabric layers.

Applications for material 10 include insoles for footwear, athletic equipment, and medical devices.

What is claimed is:

1. A breathable, stretchable, hydrophilic material comprising:

a porous inner layer of stretchable fabric;

a porous outer layer of stretchable fabric; and, a central layer of open cell foam fixed between said inner and outer layers to stretch with said inner and outer layers, wherein said central layer is comprised of compressed foam.

2. The material according to claim 1, wherein said inner layer includes a blend of polyester and spandex.

3. The material according to claim 2, wherein said blend is about 83% polyester and about 17% spandex.

4. The material according to claim 1, wherein said outer layer includes a blend of nylon and spandex.

5. The material according to claim 4, wherein said blend includes about 8.99% bright nylon, about 10.85% semi-dull nylon, and about 80.16% bright spandex.

6. The material according to claim 1, wherein said outer layer includes a plurality of loops for hook-and-loop fastening.

7. The material according to claim 1, wherein said central layer of open cell foam is compressed at a four-to-one ratio of original thickness to compressed thickness.

8. The material according to claim 1, wherein said central layer of compressed open cell foam is polyurethane foam.

9. The material according to claim 1, wherein said central layer is flame laminated to said inner layer.

10. The material according to claim 1, wherein said central layer is flame laminated to said outer layer.

11. The material according to claim 1, wherein said central layer is flame laminated to said outer layer and said inner layer.

12. A method of manufacturing a breathable, stretchable, hydrophilic material comprising the steps of:

(A) flame laminating an outer layer of porous stretchable fabric to a central layer of compressed open cell foam to form a two-layer composite material;

(B) curing said two-layer composite material for a period of time; and (C) flame laminating an inner layer of porous stretchable fabric to a central layer of compressed open cell foam to form a three-layer composite material; and (D) curing said three-layer composite material for a period of time.

13. A method of manufacturing a breathable, stretchable, hydrophilic material comprising the steps of:

(A) flame laminating an outer layer of porous stretchable fabric to one side of a central layer of compressed open cell foam and simultaneously flame laminating an inner layer of porous stretchable fabric to an opposite side of said central layer to form a three-layer composite material; and (B) curing said three-layer composite material for a period of time.

* * * * *